No. 843,306. PATENTED FEB. 5, 1907.
T. A. SHEA.
BEARING END FOR HALF ELLIPTIC SPRINGS.
APPLICATION FILED NOV. 30, 1906.
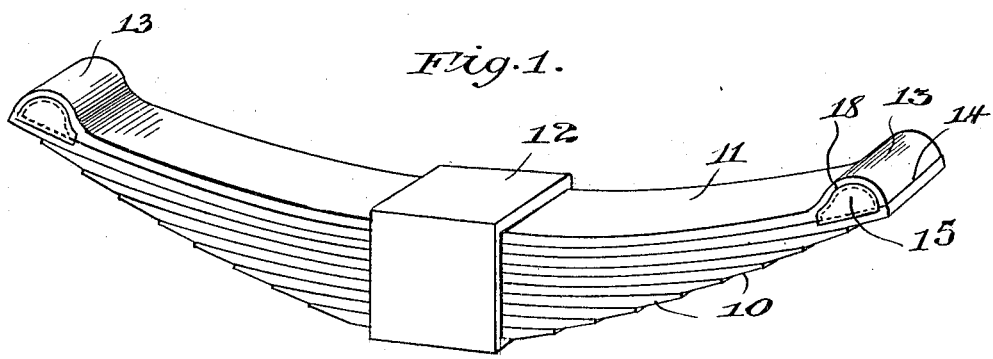
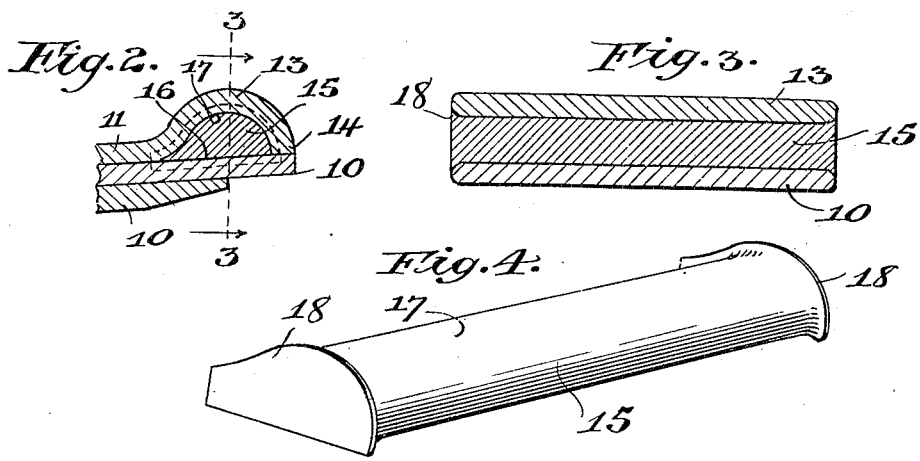

UNITED STATES PATENT OFFICE.

THOMAS ALEXANDER SHEA, OF HAMMOND, INDIANA, ASSIGNOR TO AMERICAN STEEL FOUNDRIES, OF NEW YORK, N. Y., A CORPORATION OF NEW JERSEY.

BEARING END FOR HALF-ELLIPTIC SPRINGS.

No. 843,306.     Specification of Letters Patent.     Patented Feb. 5, 1907.

Application filed November 30, 1906. Serial No. 345,787.

*To all whom it may concern:*

Be it known that I, THOMAS A. SHEA, a citizen of the United States, residing at Hammond, in the county of Lake and State of Indiana, have invented certain new and useful Improvements in Bearing Ends for Half-Elliptic Springs, of which the following is a specification.

My invention pertains to bearing ends for semielliptic springs, such as are frequently used in railway-vehicles, especially on locomotives.

More specifically my invention concerns improvements in those forms of half-elliptic springs wherein the main or back spring-plate is formed at its ends to provide bearings and in which filler-blocks are interposed between the bent portions of the main spring-plate and the underlying or adjacent spring-plate.

On the accompanying drawings, forming a part of this specification, and on which like reference characters refer to the same parts throughout the various views, I have illustrated a desirable and preferred embodiment of my invention.

Figure 1 of said drawings is a perspective view of my improved form of spring. Fig. 2 is a fragmentary longitudinal section through an end of the spring. Fig. 3 is a cross-section on line 3 3 of Fig. 2, and Fig. 4 is a perspective view of one of the filler-blocks.

The complete spring consists of a number of leaf or plate springs 10 of gradually decreasing length, together with the back or main spring-plate 11, the whole being secured together by a central strap or retainer 12. At each end plate 11 is bent to form a hollow transverse substantially semicylindrical rib or bearing 13, the ends 14 of plate 11 being bent so as to bear upon the adjacent surface of the next spring-plate 10. Within the space inside of each rib or bearing 13 I provide a filler-block 15 to prevent the bearing from crushing or losing its shape. On one side block 15 has a flat surface 16, adapted to lie on the face of plate-spring 10, and opposite the flat face 16 it has a curved or rounded surface 17 to conform to the interior contour of the rib or bearing 13. It should be noted that the edges of the leaves or plates 10 and 11, forming the spring, are rounded off and that at each end the filler 15 has a lateral bead or enlargement 18 extending completely around the same, which overlaps the edges of the rib or bearing 13 and the next plate 10, whereby a displacement or longitudinal shifting of the filler-block is prevented. This bead or rim is not large and need not project beyond the edges of the spring-plates, as shown in Fig. 3, the rounding of the edges of the plates giving sufficient space to accommodate the flanges or beads 18. Preferably the filler-block is made of cast metal; but it is obvious that the same might be constructed by upsetting the ends of a metallic bar of proper length and correct shape in cross-section. Attention is especially directed to the simplicity of my improved construction, and it should be observed that no cutting of the back or main plate 11 is required and that no retaining-pins or the like are necessary to keep the filler-block in place.

Minor mechanical changes could of course be made in the structure shown and described without departure from or sacrifice of the advantages of my invention.

I claim—

1. In a half-elliptic spring, the combination of a back or main spring-plate bent to form a hollow bearing, a second spring-plate, and a filler-block within said hollow bearing and adapted to bear against said second spring-plate, said filler-block having its ends enlarged to prevent displacement of the block by coöperation with the edges of one or both of said spring-plates, substantially as described.

2. In a half-elliptic spring, the combination of a back or main spring-plate bent to form a hollow bearing, a second spring-plate, one or both of said plates having rounded longitudinal edges, and a filler-block of substantially the same length as the width of said spring-plates placed within said hollow bearing and adapted to bear against said second spring-plate, said filler-block having its ends enlarged to prevent displacement of the block by coöperation with the edges of one or both of said spring-plates, substantially as described.

3. In a half-elliptic spring, the combination of a back or main spring-plate bent at each end to form a transverse hollow bearing, a second spring-plate adapted to lie against said back or main spring-plate, the end of said latter plate being bent to abut against the adjacent face of said second spring-plate, the longitudinal edges of both of said spring-plates being rounded, and a filler-block of substantially the same length as the width of said spring-plates within said hollow bearing and of such shape and size as to substantially fill the interior of said bearing, said block having a substantially flat face adapted to rest upon the adjacent face of said second spring-plate, the ends of said block being enlarged and coöperating with the edges of both of said spring-plates to prevent displacement of said block, substantially as described.

4. A filler-block for use in a hollow bearing of the back or main spring-plate of a half-elliptic spring, said block having a flat surface adapted to rest on the spring-plate next to said back or main spring-plate and having a surface conforming substantially to the interior contour of said bearing, said block at both ends having enlargements adapted to coact with the edges of one or both of said spring-plates to prevent lengthwise shifting of said block, substantially as described.

THOMAS ALEXANDER SHEA.

Witnesses:
WALTER M. FULLER,
L. F. McCREA.